May 23, 1961 W. R. JOHNSON 2,985,396

APPARATUS FOR COMPENSATING REEL FLUTTER IN TAPE-RECORDING EQUIPMENT

Filed March 30, 1956 3 Sheets-Sheet 1

INVENTOR.
WAYNE R. JOHNSON
BY Lippincott & Smith
ATTORNEYS

May 23, 1961 W. R. JOHNSON 2,985,396

APPARATUS FOR COMPENSATING REEL FLUTTER IN TAPE-RECORDING EQUIPMENT

Filed March 30, 1956 3 Sheets-Sheet 2

INVENTOR.
WAYNE R. JOHNSON

BY Lippincott & Smith

ATTORNEYS

INVENTOR.
WAYNE R. JOHNSON
BY Lippincott & Smith
ATTORNEYS

United States Patent Office 2,985,396

Patented May 23, 1961

2,985,396

APPARATUS FOR COMPENSATING REEL FLUTTER IN TAPE-RECORDING EQUIPMENT

Wayne R. Johnson, Los Angeles, Calif., assignor, by mesne assignments, to Minnesota Mining & Manufacturing Co., St. Paul, Minn., a corporation of Delaware Filed Mar. 30, 1956, Ser. No. 575,028

11 Claims. (Cl. 242—55.12)

This invention relates to apparatus for transferring linear material such as tape, wire, cord, thread or the like from a pay-off reel to a take-up reel, under tension and at constant speed. Primarily the invention is adapted to such transfer mechanism as used in magnetic recording and reproducing equipment, wherein, in order to preserve fidelity of reproduction, the speed of the recording tape or wire must be held constant to within extremely rigorous tolerances in order to maintain fidelity of reproduction, but it will be seen that the invention is also applicable to reeling and unreeling processes of any kind where constant speed of transfer past a given point is a primary consideration. The invention will be described as applied to tape recording and reproducing apparatus for television signals but it is to be understood that this application is chosen because the requirement for constant speed is particularly important in this connection and therefore it offers the most severe test of equipment of this character.

It is accepted practice in magnetic recording equipment to provide a transfer mechanism between interchangeable pay-out and take-up reels, each mounted on a shaft which is driven by an independent tensioning motor. Because of the very high speeds which are required in reproducing the high frequencies included in television signals, the reels which are used are very large in order to hold the amount of the recording tape which is required for a program of any reasonable length. In the recording of sound, tape speeds of 7½ and 15 inches per second are frequently used, the higher speeds being employed on equipment giving very high fidelity reproduction; in television reproduction the speeds may be from perhaps 100 inches per second to 300 inches per second, depending upon the method of recording used. For sound reproduction relatively small and light reels can therefore be employed; plastic reels, from three to six inches in diameter are quite common for this purpose. For television reproduction the reels may be in the neighborhood of 20 inches in diameter and while they may be of plastic they are generally made of metal to give rigidity and support to the tape. The amount of tape on a full reel has a very considerable mass, quite irrespective of the mass of the reels themselves.

In high quality apparatus of the character described the tape drive is ordinarily provided by a capstan that engages the tape frictionally, while separate motors drive the take-up reel and brake the pay-out reel and means are provided so to control these motors that the average tension on the tape is sensibly constant. The winding on the reels is always eccentric in some degree. The inertia of the reels prevents rapid changes in their rotational rates to compensate for the cyclic changes in the lever arm of the tape caused by the eccentricity and therefore the speed at which the tape is payed out and taken up varies around the average.

To compensate for such changes in velocity spring-biased tensioning arms or the like are usually provided which engage loops of the tape between the reels and the capstan to vary the length of tape in the loops as its speed varies around the average value. The changes in position of the arms in accomplishing this varies the deformation of their biasing springs and hence the tension applied by the arms to the tape. Such variation is reflected as a variation in the load on the capstan motor, with accompanying, although slight, cyclic variations in its speed.

The result is a phase modulation of the signals recorded on the tape. In the recording and reproduction of television signals where a maximum amount of information must be crowded on a minimum length of tape and relative phase of the signals so recorded is important, this distortion can be very serious.

In order to prevent such changes in load on the capstan motor with changes in speed and tension-arm position would require a biasing spring of infinite compliance. On the other hand the spring must be reasonably stiff to maintain the necessary tension. These requirements are seemingly incompatible.

As has been stated, the invention is applicable to any mechanism for transferring a linear material from a pay-out to a take-up device where it is essential that the material be progressed at a constant speed past a given point. Requirements for speed constancy are usually most severe in equipment for progressing media for the recording and reproduction of electrical waves, whether those waves represent sound, television signals, or data of any other kind whatsoever. In its essentials the invention comprises a movable member which engages the material between a pay-out-element and a driving means, the driving means and a take-up element, or, preferably, both, in such manner as to change the length of the path of the material transferred, lengthening the path by movement in one direction and shortening it by movement in the other, without changing its tension. The tension element may be a pivoted arm, a slide, or, in fact, substantially any arrangement such as has been conventionally used for the purpose. As in the case of conventional tensioning means, that used in accordance with this invention is spring biased or loaded, so that the tension that it applies is proportional to the deformation of the spring. In addition to these conventional elements there is provided electromagnetic means for exerting on the tensioning element a force algebraically additive to that of the biasing spring. This means may be a solenoid, or it may be a coil moving in a magnetic field, as in the case of a d'Arsonval meter movement, the moving coil element of an electrodynamic type loud-speaker, or even the armature of a small electric motor; the requirement is that the pull or torque exerted in algebraic addition to the spring be substantially directly proportional to the voltage (or current) applied to the exciting winding, and that the inertia of the entire moving system be relatively small in comparison to the force applied by the spring. With the coils unexcited the spring should be capable of moving the mass of the device much more rapidly than any motion which would be imparted to the device as a whole by variations in the speed in the tape, wire, or motion picture film or other linear material which the device is intended to control. Means are provided for developing from the moving medium an electrical signal which varies in intensity, polarity, or both with the instantaneous speed of the medium between the pay out and take up devices. This signal is applied to the electro magnetic device in such sense as to maintain the algebraic sum of the forces applied to the tensioning member constant, irrespective of the degree of deformation of the spring. In a preferred form of this latter means there is attached to the tensioning element the moving member of a potentiometer which is supplied by a constant-voltage source and is so arranged that the voltage between one end of the potentiometer and the contact which moves with respect to its resistance element varies directly with the deformation of the spring and therefore directly with the force exerted by the spring on the tensioning member. The voltage developed across the potentiometer is applied to vary the current in the coils of the electromagnetic means (if it opposes the spring) in such direction as to increase the current as the stress on the spring increases and decrease it with decreased stress, or to vary the current in opposite sense if the electromagnetic force aids the spring, and means are provided for so adjusting the drop across the potentiometer that the change in the force exerted by the magnetic means is equal and opposite to the change in force exerted by the spring, at least through the range of movement that is reasonably to be expected due to change in tape speed. It is possible so to arrange the parts that the potentiometer voltage is applied directly to the magnetic windings; usually, however, it is preferable to interpose an amplifier.

Since both the change in spring deformation and change in potentiometer voltage are direct and linear functions of the displacement of the tensioning device, the two can be exactly balanced, with the result that the effective tension exerted by the tensioning device is a constant, irrespective of its position, giving to the spring what is effectively an infinite compliance. Using spring bias alone this could only be accomplished with an infinitely long spring; the degree to which this desideratum can be approached in practice is limited only by the friction of the parts, the accuracy with which the magnetic and elastic forces can be balanced, and, to a minor extent, the geometry of the arrangement, which may result in some very minor nonlinearities.

In the drawings, illustrating the detailed description of the invention which follows:

Fig. 1 shows schematically the essentials of the tape transfer mechanism of a magnetic recorder or reproducer, which except for the particular tension compensating arrangement of the present invention is substantially of conventional type. There may be various modifications in the tape path and in the type of compensation used for maintaining the tension, but that shown can be considered typical.

Figure 1:
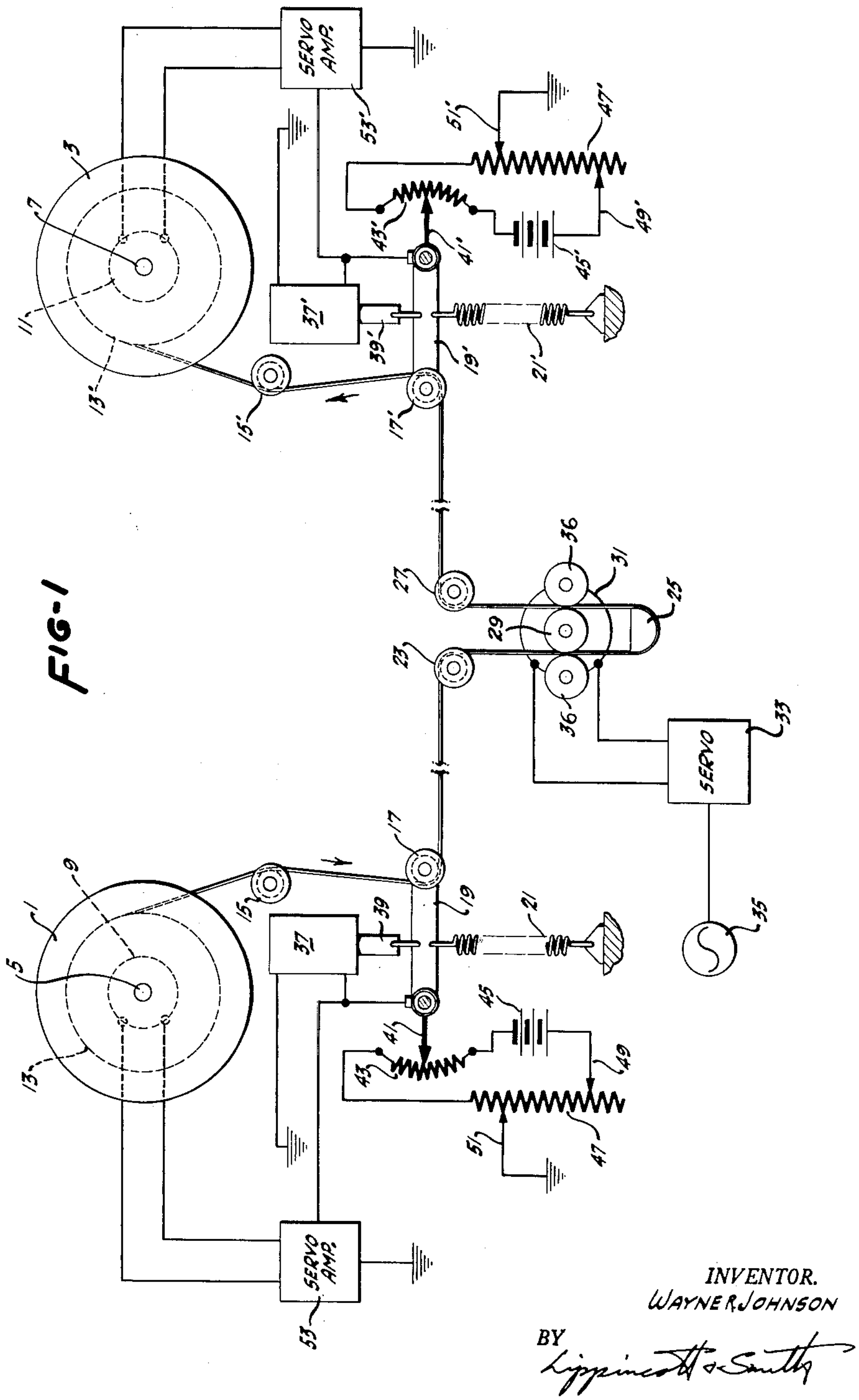
Fig. 1 is a schematic diagram illustrating in simplified form the mechanical and electrical construction of a tape transfer mechanism embodying the invention, as employed in the recording and reproduction of television signals.

In the equipment symbolically illustrated, a pay-out reel 1 and a take-up reel 3 are mounted, respectively, on the shafts 5 and 7 of tensioning motors indicated by the dotted circles 9 and 11. The two reels are identical and interchangeable, and are mounted upon the shafts in such manner as to minimize any eccentricity or play in the mounting. Coils of tape are indicated at 13 and 13′ on the two reels. The direction of movement of the tape is indicated by the arrows shown parallel to the path. As shown, the tape as it comes at changing angle off of the pay-out reel 1 passes first over a guide post or roller 15 which directs it at a substantially constant angle over a similar guide 17, mounted on the end of a pivotally-mounted tension-arm 19 which is retracted by a spring 21. In passing over the roller or guide post 17 the tape makes an approximately right-angle turn and then passes over a fixed guide 23, where it again makes a right-angle bend to make a loop around the transducer heads 25 and then back, substantially parallel to its path from guide 23, to a similar guide 27. From guide 27 the tape passes over a tensioning mechanism which, since it is substantially identical to that already described, is designated as to its various parts by the same reference characters, distinguished by accents. Leaving the tension-arm 19′ it passes over a guide or roller 15′ and thence to the take-up reel.

The tape is driven, as it approaches and leaves the transducer heads in its path to and from the guides 23 and 27, by a capstan 29 driven by a motor 31. For present purposes this motor can be considered as a constant speed device, although in any equipment which is sufficiently refined to require the degree of constancy in the reproduced signals provided by the present invention, there would usually be provided also a feedback system for comparing the frequency and phase of a pilot signal of constant frequency, recorded on the tape, with the frequency of a stabilized oscillator operating at the frequency at which the pilot frequency should be reproduced. Usually, in such case, the motor 31 is of the synchronous type and its driving frequency is varied to compensate for variations in the average frequency of the pilot signal from the recording head with that of a comparison oscillator. This arrangement is symbolized in the drawing by the block 33, labelled "servo" and the symbolically shown constant-frequency oscillator 35. Since these elements have been shown elsewhere and are only indirectly related to the present invention it is considered unnecessary to describe them in further detail. The tape is maintained in contact with the driving capstan 29 by friction rollers 36, pressing in from either side of the tape in its passage over the capstan.

Where rollers are used as guides they should be mounted in anti-friction bearings without any measurable play and should be carefully ground to exact concentricity with their shafts, since any eccentricity whatsoever will tend to vary tape speed and hence introduce flutter into the reproduced signal. With the exception of the friction rollers 36, all the guide rollers can be replaced by fixed posts having highly polished surfaces. The use of such posts as guides avoids any difficulty due to eccentricity, but it also increases friction and wear on the tape. Which type of guide is used is therefore a matter of engineering judgment.

The tension arm 19 is of sufficient length to make the path of the guide 17 substantially linear throughout a range of motion adequate to take up the cyclic variations in tape speed due to eccentricities of the windings on the two reels. There will also be some further motion, through a limited range, which produces a long term variation in the torque applied by the tensioning motors 9 and 11 to compensate for the variation in the lever arm through which this tension is applied to the tape. These effects will be discussed later in this specification; for the present it is sufficient to note that for small angles of motion of the tension lever the distance between the point of tangency of the tape at rollers 15 and 17 varies directly with the movement of the lever arm while the length between the points of tangency between guides 17 and 23 is unaffected by this movement. This being the case, the length of the tape path between rollers 15 and 23 varies directly with variation in angle of the tension arm 19. It follows that the extension of the spring 21, and therefore the tension which it exerts on the tape, is also a linear function of the lever arm motion.

As thus far described the apparatus conforms, in principle at least, with known practice. In accordance with the present invention additional electromechanical equipment is coupled to the tension arm 19. This equipment comprises electromagnetic means, here symbolized by a solenoid 37 having a plunger or core 39, for exerting a force on the tension-arm in direct opposition to that of the spring 21, plus electrical circuits for applying to the winding a current which varies linearly with the position of the arm and which results in the application, through the solenoid plunger, of a force which changes equally and oppositely to the changes in force due to varying extension of the spring 21. In order to accomplish this there is fixed to the arm or its shaft the moving element of a potentiometer. Most conveniently this will be the movable contact 41 which bears against a fixed resistor 43 of constant resistance per unit length. This arrangement could, of course, be reversed, with a resistance element mounted on the shaft of the tension arm and the contact stationary. The potentiometer is connected in series with a source of constant potential 45 and a variable resistance element 47. A movable contact 49 connects the source 45 with the resistor 47. By adjusting this contact the proportion of the total voltage of the source which appears across the potentiometer can be adjusted, and by this adjustment the change in voltage per degree of rotation of the tension arm can be given any desired value.

A second movable contact 51 also bears on the resistor 47. This contact connects to ground. The winding of the solenoid 37 is connected from ground to the potentiometer contact 41. The voltage across the solenoid winding therefore varies directly with motion of the tension arm. As will be seen in the figure, if the tension arm moves clockwise, relaxing the tension on the spring 21, the contact 41 traverses the potentiometer in a direction which shortens the portion connected between it and the ground contact 51 and thereby reduces the potential applied across the solenoid winding. The mean pull of the solenoid plunger, when the contact 41 and the arm 19 are in their mean position, can be adjusted by means of the contact 51.

It may be noted that the same potentiometer can be used to control the average tension on the tape and keep it constant with variations in the diameter of the coils on the two reels. Ideally, the tensioning motors 9 and 11 should exert equal and opposite pulls upon the tape, so that in the absence of drive from the capstan there would be no tendency for the tape to move in either direction. This pull should be just enough to keep the tape tight and prevent any overrunning, sagging or entanglement of the tape. This implies that in operation motor 9 runs backward, against the tendency to turn due to its excitation. Motor 11 tends to run forward, but can only do so to the extent that it is not restrained by the tape. Dynamically it must exert sufficient tension to overcome the friction of the tape in its passage from guide 27 on to the reel and to overcome the inertia of the reel in starting. On the other hand, the capstan must supply the energy required to speed up reel 1 and to overcome the friction between reel 1 and guide 27. The tension on the tape between reel 1 and the capstan can therefore be considered as comprising two components; a "static" component which is balanced by the tension applied from reel 3, plus a dynamic component supplied by the capstan which drives the tape.

Various types of motor can be used to provide the "static" component of the tension. For example, direct current motors may be used, with separate sources for supplying the field and armature. With either one of these constant, the torque will be directly proportional to the current in the other winding. Accordingly, the same potential which is applied to vary the current in the solenoid 37 may also be applied to a suitable servo-amplifier 53, amplified there and supplied to one of the windings of the motor 9. The higher the amplification, in this case, the better, since the smaller will be the motion required of the tension-arm to produce a given change in torque. In the pay-out reel the torque must constantly decrease as the lever arm of the tape moves down. As the lever arm moves downward in the diagram in response to a small incremental decrease in torque, a highly amplified voltage differential appears in the output of the servo-amplifier. In accordance with well known feedback theory, the variation in potentiometer voltage needs to be very small to effect the necessary change. Overcontrol results in increased torque by the motor, tightening up of the tape, and consequent reduction to bring the torque back to its proper value. The control upon the take-up motor 11 is of precisely similar character, except that in this case the spring 21' needs only to be sufficiently stiff to balance the static component of the torque, and not that necessary to accelerate and overcome the friction of the tape. Except for the fact that the control voltage from the motors can be picked up from the same potentiometer that is used to correct flutter, this type of control is well known in practice. It is described in detail merely to provide the background for the operation of the flutter compensator and to indicate, together with the description of the mechanism for controlling the speed of the driving capstan, that is justifiable to assume that the average tension on the tape is constant with respect to both its static and dynamic components and that the speed of rotation of the capstan is also, on the average, a constant. Upon these postulates, if the tension on the tape can be constant in spite of variations in the rate of pay-out and take-up, the load on the driving capstan will be a constant, its phase angle with respect to its driving frequency will be a constant, and the major cause of frequency modulation due to flutter will be eliminated.

It should be noted that while the flutter compensating device includes a feedback loop this portion of the apparatus does not, in this particular form of the invention, include the self-regulating characteristics which are associated with the usual negative feedback theory. Instead of operation improving with greater feedback or amplification between the control potentiometer and the solenoid, the ratio of arm-motion to solenoid current must be accurately adjusted. With the correct ratio the apparent compliance of the tensioning spring becomes infinite, in that the total tension applied by the arm to the tape does not vary with the position of the arm. If the ratio of change of current to change of arm position is less than is required for accurate balance an improvement is effected in constancy of tension, due to an apparent increase in compliance of the spring 21; if the ratio is greater than that required to achieve a balance the compliance becomes finite but negative. If the current-to-arm-motion ratio is double that required to achieve an exact balance the change in tension will be the same as in the uncompensated case but in the opposite direction and any increase beyond the double value will actually result in an increase in flutter. With the proper adjustment of drop across the potentiometer the flutter compensator becomes astatic, the flutter compensation being independent of the position of the arm. The arm can therefore move sufficiently to maintain the correct tension on the tape, through the servo-amplifier 53 and its associated mechanism, without affecting the flutter compensation itself. On the other hand, the slight motion of the potentiometer arm due to flutter does not affect the over-all tension control through the tensioning motors. The inertia of the rotating reels is so great that the instantaneous variations cannot greatly affect the speed of the reels in a single revolution, but in any event the variation will not differ in order of magnitude, and only very slightly in actual value, from the variations in feedback to the servo-amplifier where the compensation of flutter is not used.

The use of the two different types of compensation, both derived from the same movement of the tensioning arm, are entirely compatible. Of course separate potentiometers can be used to derive the two control voltages if desired.

Figure 2:
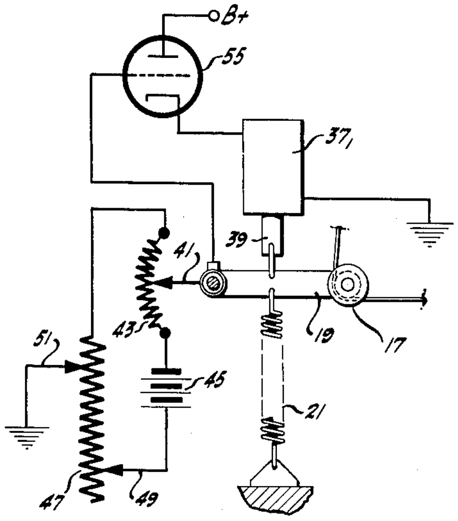
Fig. 2 is a schematic diagram showing the circuitry involved when amplification is employed between the potentiometer, which develops the voltage which controls the compensating mechanism, and the mechanism itself.

In Fig. 1 the circuitry of the compensator is reduced to its simplest terms. In practice it is preferable to employ some power amplification between the potentiometer and the coils of the compensator. One arrangement embodying amplification is illustrated in Fig. 2. In this and succeeding figures elements having the same structure and function as like elements of Fig. 1 are designated by the same reference characters, while those of like function but differing more or less in structure are given like reference characters but distinguished by subscripts.

In Fig. 2 the arrangement for developing the control voltage is identical with Fig. 1. Instead of the lead from the potentiometer going directly to the solenoid winding 37, however, it connects the control grid of a cathode-follower tube 55, having the solenoid connected in its cathode circuit. If the impedance of the solenoid is high in comparison with the effective impedance of the tube 55 and the latter has a relatively high amplification constant, the voltage appearing across the solenoid will vary linearly with the voltage applied to the control grid of the tube. The impedance into which the potentiometer feeds, however, is very high and the drop through the potentiometer is not affected by the load drawn by the winding. The latter can therefore be made much more rugged than where no amplification is used and the problems of design therefore become simpler. Owing to the power amplification, the pull of the solenoid is increased and the spring 21 can be made stiffer.

Figure 3:
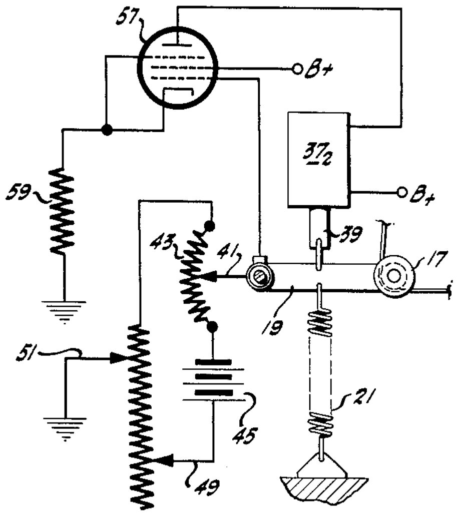
Fig. 3 is a diagram similar to Fig. 2, showing a somewhat different form of amplifier.

If the design of the solenoid (or equivalent device) is such that there is an appreciable change in its impedance with variation in flutter frequency, the solenoid current for a given input voltage will also change with frequency and the nice balance desired throughout the range of operation cannot be maintained. Under these circumstances the circuitry of Fig. 3 may be employed. This differs from Fig. 2 only in the fact that a very high impedance tube, such as a pentode 57, is employed as the amplifier and the impedance of coil $37_2$ is lower than the plate impedance of the tube by at least one order of magnitude and preferably two or three. The disadvantage of this arrangement is that the output of tube 57 is more dependent upon the characteristics of the tube than is the case with that of Fig. 2 and any nonlinearity in the tube has an adverse effect upon the accuracy of compensation. If, however, the tube has a plate impedance of the order of a megohm, and the effective impedance of the solenoid $37_2$ varies by 100 or 200 ohms with variation in flutter frequency, 40 db feedback can be introduced by the use of an unbiased cathode resistor 59 to reduce the effective tube resistance to approximately 100,000 ohms and at the same time reduce monlinearities to a negligible amount. Tube current is therefore a sufficiently linear function of grid voltage to make the pull on the solenoid linear to within a small fraction of one percent.

Other slight nonlinearities are introduced by the geometry of the parts, owing to the fact that the movement of the guide 17 on the end of the tension arm is not truly rectilinear. The extent of these nonlinearities depends upon the relative positioning of the parts; preferably the distance between guide 17 and guide 23 should be long in comparison to the length of the arm 19, so that the change in the angle of this reach of the tape with change in position of the arm is only a few degrees. Under these circumstances, if the arm be permitted a total movement of ±10 degrees from the position where the tape makes a 90 degree angle around the guide 17, the change in the length of tape with movement of the arm will vary from the norm by approximately ±1 percent. With the use of such arrangements on both the pay-off and take-up reels flutter can be reduced by a factor of from 10 to 20.

Figure 4:
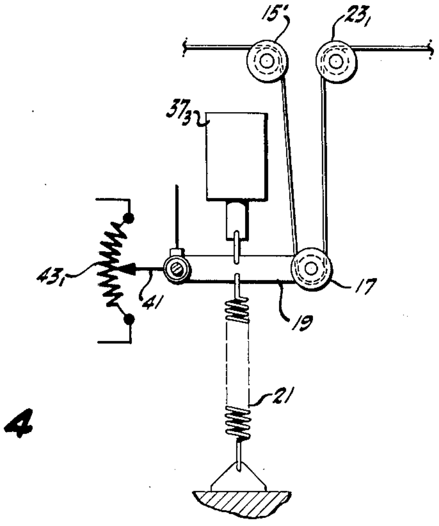
Fig. 4 is a fragmentary schematic diagram illustrating a different arrangement of tape path and tensioning arm.

Still using a pivoted arm as the tensioning member, the geometrical nonlinearity can be further reduced by making the tape guide 17 engage a loop of the tape instead of a nominally right-angle bend, as is shown in Fig. 4. The change in length of tape between the guide 15′ and 29′, for a given motion of the arm, is twice that obtained where the tape is turned to 90 degrees in its passage around guide 17. The tension of spring 21 must be twice that in the former case in order to exert the same tension on the tape, but for a given change in instantaneous speed of pay-out from the reel its change in extension will only have to be half as great, other things being equal. The drop across the potentiometer $43_1$ is doubled, but the change in solenoid current to compensate for a given change in tape speed remains the same. Because the change in length of tape is more nearly linear and because the movement of the arm is smaller in accomplishing this change the arrangement of Fig. 4 is more accurate than that of Fig. 1, but it consumes a little more power and takes up a little more room. In a given piece of apparatus these facts may or may not be determining.

Spring 21 has in each case been shown as a tension spring, purely for the sake of simplicity. It is to be understood that a clock-spring surrounding the shaft on which arm 19 is pivoted is just as effective, follows the same laws, and is equally applicable and frequently more convenient. Similarly, although the compensating electromagnetic device has been shown as a solenoid, this also has been done for the sake of simplicity in the drawing and convenience of explanation. It should be evident that a motor armature, mounted directly upon the shaft of the tension arm will vary the torque applied to it in the same manner as the solenoid shown, and probably even more linearly. Such a motor can have a permanent-magnet field and the armature does not even need a commutator since its total rotation is restricted to 20 degrees or so.

Figure 5:
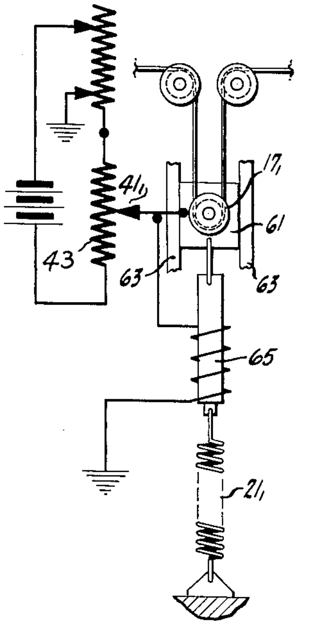
Fig. 5 is a similar fragmentary diagram showing the use of a slide as a tensioning member instead of a pivoted arm.

It is not necessary that the tensioning member be an arm; as shown in Fig. 5 the guide $17_1$ can be mounted on a slide 61, running in ways 63. It can engage a 180 degree loop of the tape as in the case of Fig. 4, and be retracted by a tension spring $21_1$. The counterbalancing electromagnetic pull may be supplied by a solenoid 65, or by a loud-speaker-type of moving coil mounted between the spring and the slide in the field of a permanent magnet. In this case the potentiometer 43, can be linear instead of arcuate, and contacted by a moving arm $41_1$ mounted on the slide.

Figure 6:
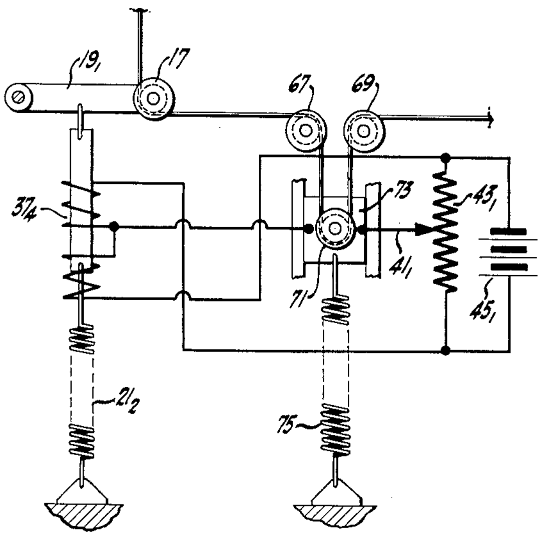
Fig. 6 is a similar fragmentary diagram illustrating the use of separate means for measuring and for varying the tension applied to the tape.

Fig. 6 shows a modification of the invention wherein negative feedback theory does apply. In this case the tension-compensating arm and the tension measuring device are separated, so that an error signal is fed back to adjust the tension. After leaving the guide 17 of the tensioning arm the tape passes in succession over additional guides 67 and 69, between which it passes over a movable guide 71 on a slide 73, the arrangement being similar to that of the tensioning arrangement shown in Fig. 5. In this case, however, the slide is retracted by a spring 75, the tension of which is so adjusted that when the movable contact $41_1$ on potentiometer $43_1$ is in its median position the spring 75 exerts the proper degree of tension on the tape. The tension arm $19_1$ is biased by spring $21_2$, plus the pull exerted by a differential solenoid $37_4$, this solenoid being so adjusted that in this case its pull can either add to or subtract from the bias exerted by the spring. The voltage of the source $45_1$ is so adjusted that when the contact $41_1$ is in its median position the combined biases exert the proper tension on the arm $19_1$ and the tape. With this arrangement a true error signal is supplied to the differential solenoid, the portion of the pull supplied by it increasing or decreasing depending upon the position of the contact $41_1$. Amplification can be included between the battery or other source $45_1$ and the solenoid, so that a very small movement of the contact $41_1$ makes a very large difference in the pull. By increasing the gain between the potentiometer and the differential solenoid the amount of change in tension may be made as small as may be required.

Figure 7:
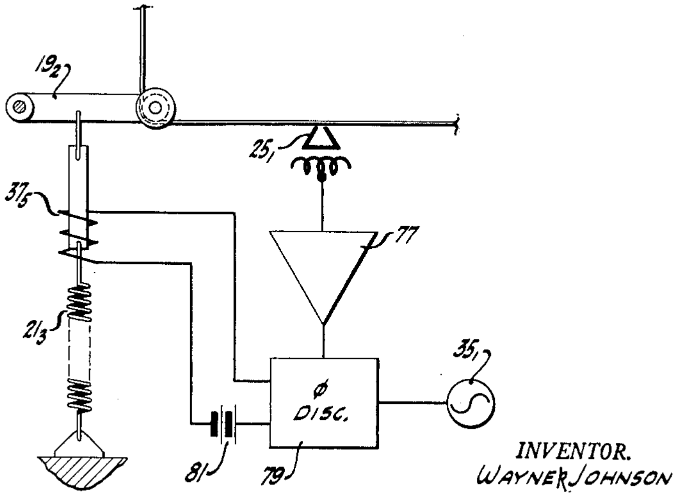
Fig. 7 is a like diagram illustrating the use of a signal developed by the velocity of a tape, instead of directly by its tension, for supplying the correcting signal.

Fig. 7 shows still another method of developing an error signal. In this case it is the velocity of the tape that supplies it. A pilot frequency (it may be the same pilot frequency used to maintain the average speed of the motor 31 which drives the capstan at its constant average speed) is recorded on the track. This frequency is picked up by a transducer $25_1$, amplified by an amplifier 77, and phase-discriminated against the frequency of a stabilized oscillator $35_1$ (which may be the same used to regulate the speed of the capstan) in a discriminator 79. The tensioning arm $19_2$ is biased by a spring $21_3$ plus a pull exerted by the solenoid $37_5$ due to a constant voltage derived from a biasing battery 81. The output of the phase discriminator 79 adds to or subtracts from this pull, depending upon whether the shift in phase of the pilot frequency shows an increase in speed, indicating that the tension is too light, or decrease, indicating that it is too heavy. As in the case of the arrangement of Fig. 6, the greater the amplification the more accurate the control and the greater the decrease in flutter.

It should be evident that various of the features shown in the several modifications illustrated can be interchanged or substituted as between these modifications. It has already been mentioned that the solenoids are shown primarily because of ease of illustration. It has not been emphasized, however, although it has been shown, that the magnetic pull may be either in the same direction as the spring bias on the tension member or it may be opposed thereto. If in the same direction the electrical connections are reversed as compared to the case where the pulls are opposed, so that as the tension spring is relaxed the magnetic pull increases instead of decreasing as in the arrangement shown in Fig. 1. Whatever the arrangement the algebraic sum of the magnetic and spring tensions is a constant. The magnetic pull may be zero at the mean or normal position of the tension member, changing in direction with a departure from the norm, or it may have a finite value at the normal position which increases or decreases depending upon the direction of departure from the norm.

The various forms of the invention shown are typical but by no means exhaust the list of variants of the invention. It is for this reason that the various embodiments shown are not intended to define the limits of the invention, all intended limitations being specifically expressed in the following claims.

I claim:

1. In mechanism for transferring linear material such as tape, wire, cord and the like, from a pay-out device to a take-up device under tension and at a substantially constant speed, means for maintaining the tension on said material constant under fortuitous speed variations of such pay-out and take-up devices, comprising a movably mounted member positioned to engage said material in its passage between said devices and to lengthen or shorten the path of said material therebetween in accordance with its direction of movement, spring biasing means tending to force said member in a direction such as to lengthen said path, electromagnetic means connected to said member and adapted when energized to exert a force thereon algebraically additive to that of said spring biasing means, an energizing source for said electromagnetic means, and means actuated by movement of said member connected to vary the energy delivered by said source to said electromagnetic means to maintain the algebraic sum of the spring biasing force and the force exerted by said electromagnetic means substantially constant.

2. In mechanism for transferring linear materials such as tape, wire, cord and the like from a pay-out reel to a take-up reel under tension and at substantially constant speed, means for maintaining the tension on said material constant under fortuitous speed variations of the reels comprising a pivotally mounted tension arm position to engage said material in its passage between said reels and to lengthen or shorten the path of said material therebetween in accordance with its direction of movement, spring biasing means tending to rotate said arm in a direction to lengthen the path of said material, electromagnetic means adapted when energized to exert on said tension arm a force algebraically additive to that of said spring biasing means, an energizing source for said electromagnetic means, and means actuated by movement of said arm connected to vary the energy delivered by said source to said electromagnetic means so as to maintain the algebraic sum of the forces exerted by said spring biasing means and said electromagnetic means substantially constant.

3. In mechanism for transferring linear material such as tape, wire, cord, and the like from a pay-out reel to a take-up reel under tension at substantially constant speed, means for maintaining a tension on said material constant under fortuitous speed variation of said reels comprising a pivotally mounted arm positioned to engage said material in its passage between said reels and to lengthen or shorten the path of said material therebetween in accordance with its direction of rotation, spring biasing means tending to rotate said arm in the direction to lengthen said path, electromagnetic means connected to said arm and adapted when energized to exert a force thereon algebraically additive to that of said spring biasing means, a potentiometer comprising a resistance member and a contact member movable with respect thereto, one of said members being mechanically connected to said arm so as to produce a relative movement between said members upon rotation of said arm, a source of electrical energy for said electromagnetic means, and interconnecting means between said potentiometer and said source connected to vary the energy delivered by said source to said electromagnetic means to maintain the algebraic sum of the forces exerted by said spring biasing means and said electromagnetic means substantially constant.

4. In combination with the apparatus for progressing a strip of material from a pay-off reel to a take-up reel at constant speed as said strip passes a point between said reels, means for compensating instantaneous variations in the speed of the strip which comprise a pivotally mounted tension arm adapted to engage a loop of said strip between said pay-out reel and said point and by movement about the pivotal mounting thereof to vary the length of said loop, spring biasing means connected to said arm tending to increase the length of said loop, electromagnetic means connected to said arm tending when energized to exert a force in opposition to that of said spring biasing means, a source of electrical energy connected to energize said electromagnetic means, and means connected to said arm and operative by movement thereof to decrease the energy supplied by said source to said magnetic means when said arm is moved in a direction to increase the length of said loop and increase the energy so supplied upon movement of said arm in the opposite direction.

5. In mechanism for transferring linear material such as tape, wire, cord and the like from a pay-off reel to a take-up reel which includes means for driving said material at substantially constant speed and means for maintaining the average tension on said material substantially constant irrespective of the amount thereof on each reel, means for maintaining the instantaneous tension on said material constant despite changes in reeling speed due to reel eccentricities and the like comprising a pivotally mounted tension arm adapted to engage said material in its path between said reels and to form a bend therein such that motion of said tension arm around the pivotal mounting thereof increases or decreases the length of the path depending upon the direction of motion of said arm, a potentiometer comprising a resistance element and a movable contact engaging said resistance element so connected to said tension arm that movement of said arm varies the position of said movable contact with respect to said resistance element, spring biasing means connected to said tension arm to apply a force thereto tending to increase the length of the path of said material, a solenoid having a plunger also connected to said tension arm and tending when energized to exert a force in opposition to said spring bias, an electrical source connected to energize said solenoid, and means connecting to said potentiometer and operative in response to changes in position of said contact with respect to said resistance element to vary the energy supplied from said source to said solenoid so as to decrease said energy in response to movements of said tension arm which would lengthen said path and increase said energy in response to movements of said arm which cause shortening of said path.

6. In apparatus for transferring linear recording medium from a pay-out reel to a take-up reel at substantially constant average speed which includes means interposed between said reels for driving said medium and a spring-biased tensioning member engaging said medium between one of said reels and said driving means to vary the length of said medium therebetween so as to maintain said medium under tension despite cyclic variations in outer diameter of the medium carried on said one reel, means for maintaining the tension on said medium constant comprising electromagnetic means mechanically connected to said tensioning member for applying to said tensioning member a force algebraically additive to the spring bias applied thereto, means operative in response to instantaneous changes in the speed of said medium for developing an electrical signal varying substantially linearly with such changes in instantaneous speed, and connections for applying said signal to said electromagnetic means in such sense as to maintain the algebraic sum of said spring bias and said force substantially constant.

7. Apparatus as defined in claim 6 wherein said means for developing an electric signal comprises a potentiometer mechanically coupled to said tensioning means and a source of electrical potential connected to said potentiometer.

8. Apparatus as defined in claim 6 wherein said means for developing an electrical potential comprises a separate spring balancing member engaging said medium, a potentiometer mechanically connected for movement with movement of said member and a source of electrical potential connected to supply said potentiometer.

9. Apparatus as defined in claim 6 wherein said means for developing an electrical signal comprises a transducer head adapted to pick up a pilot signal recorded on said medium at constant frequency, an amplifier connected to said transducer head, an oscillator operative to generate oscillations of said constant frequency, and a phase-discriminator connected to compare the amplified pilot signal and said oscillations to develop therefrom said electrical signal.

10. Apparatus for progressing strip material from a pay-out reel to a take-up reel at a constant speed comprising a driving means attached to frictionally engage the linear material for moving it from the pay-out reel to the take-up reel, a first motor to brake the pay-out reel and a second motor to drive the take-up reel, a pivotally mounted tension arm adapted to engage a loop of the strip material between the pay-out reel and the frictional driving means so that motion of the pivotally mounted arm around its pivot mounting increases or decreases the length of the path depending upon the direction of movement of the arm, a potentiometer comprising a resistance element, a movable contact engaging said resistance element, the resistance and contact elements being so connected that arm movement varies the relative position of the contact and the resistance element, spring biasing means connected to the tension arm to apply force thereto tending to increase the length of the path of said linear material, electromagnetic means connected to said arm and adapted, when energized, to exert a force thereon which is algebraically additive to that of the spring biasing means, a source for electrical energy for said electromagnetic means, means between the potentiometer and the source to vary the energy delivered by the source to the electromagnetic means to maintain the algebraic sum of the forces exerted by the spring biasing means and the electromagnetic means substantially constant, and means also to apply the voltage effective instantaneously at the contact point on the potentiometer to the reel drive means.

11. In combination with apparatus for transferring linear record medium from one location to another at substantially constant average speed, a pair of reels from one of which the record medium is adapted to be unwound and upon the other of which the record medium is adapted to be wound, a driving means for frictionally engaging the record medium for moving it from the pay-out device to the take-up device, a first motor means to drive the take-up device and a second motor means to brake the pay-out device, a spring-biased tensioning member adapted to engage the record medium between the pay-out device and the said driving means to vary the length of the record medium therebetween to maintain the medium under tension despite cyclic variations in the outer diameter of the record medium carried upon the pay-out and take-up devices, electromagnetic means mechanically attached to said tensioning member for applying to said tensioning member a force algebraically additive to the spring bias applied thereto, means for developing an electrical signal voltage in response to instantaneous changes in the speed of the record medium which varies substantially linearly with such speed changes, means to control the effectiveness of the magnetic means by said electrical signal in a sense to maintain the algebraic sum of the spring bias and the electromagnetic force and thus the tension on the linear record substantially constant, and means connected to receive the developed electrical signal voltage to provide a modified torque on the pay-out and take-up devices which changes in the tensioning means as the record medium is passed between the pay-out and drive device and between the drive device and the take-up device.

References Cited in the file of this patent

UNITED STATES PATENTS

| | | |
|---|---|---|
| 2,339,939 | Michel | Jan. 25, 1944 |
| 2,733,871 | Reinhold | Feb. 7, 1956 |
| 2,814,676 | House | Nov. 26, 1957 |